United States Patent

Esteghlal et al.

[11] Patent Number: 6,098,606
[45] Date of Patent: Aug. 8, 2000

[54] METHOD OF OPERATING AN INTERNAL COMBUSTION ENGINE SUCH AS AN ENGINE OF A MOTOR VEHICLE

[75] Inventors: Gholamabas Esteghlal, Ludwigsburg; Georg Mallebrein, Korntal-Münchingen, both of Germany

[73] Assignee: Robert Bosch GmbH, Stuttgart, Germany

[21] Appl. No.: 09/106,003

[22] Filed: Jun. 29, 1998

[30] Foreign Application Priority Data

Jun. 27, 1997 [DE] Germany ............................. 197 27 297

[51] Int. Cl.[7] ....................................................... F02B 75/08
[52] U.S. Cl. ............................ 123/698; 123/520; 123/687
[58] Field of Search ................................................ 123/698

[56] References Cited

U.S. PATENT DOCUMENTS

| | | |
|---|---|---|
| 5,245,978 | 9/1993 | Orzel . |
| 5,553,595 | 9/1996 | Nishioka et al. . |
| 5,611,319 | 3/1997 | Machida . |
| 5,634,454 | 6/1997 | Fujita ........................................ 123/698 |
| 5,685,285 | 11/1997 | Ohtani et al. ............................ 123/698 |
| 5,778,867 | 7/1998 | Osanai ..................................... 123/698 |
| 5,806,507 | 9/1998 | Osanai ..................................... 123/698 |
| 5,836,293 | 11/1998 | Osanai ..................................... 123/698 |
| 5,839,421 | 11/1998 | Suzuki ..................................... 123/698 |

*Primary Examiner*—John Kwon
*Attorney, Agent, or Firm*—Walter Ottesen

[57] ABSTRACT

The invention is directed to a method for operating an internal combustion engine such as for a motor vehicle. Regeneration gas is added for only a short time duration (T) to air inducted into the combustion chamber of the engine and fuel is injected directly into the combustion chamber. The fuel and regeneration gas are combusted in the combustion chamber and a specific behavior of the combustion of the fuel and the regeneration gas is assumed. The actual combustion behavior of the fuel and the regeneration gas is detected and the hydrocarbon concentration of the regeneration gas is determined from the assumed specific behavior and the detected behavior. Fuel is injected into the combustion chamber during the next time duration (T) for an injection time (TI) dependent upon the hydrocarbon concentration.

15 Claims, 3 Drawing Sheets

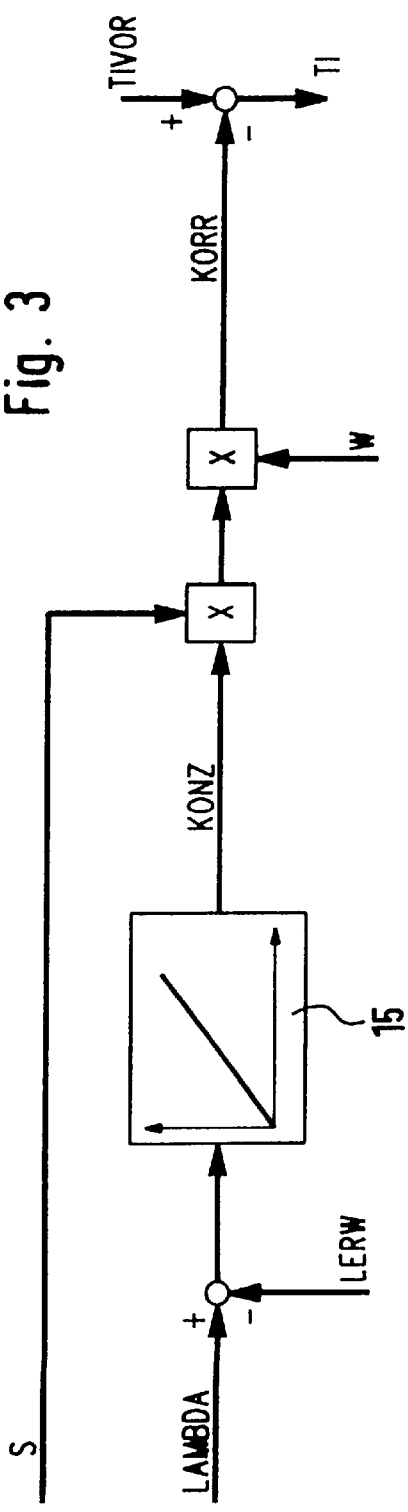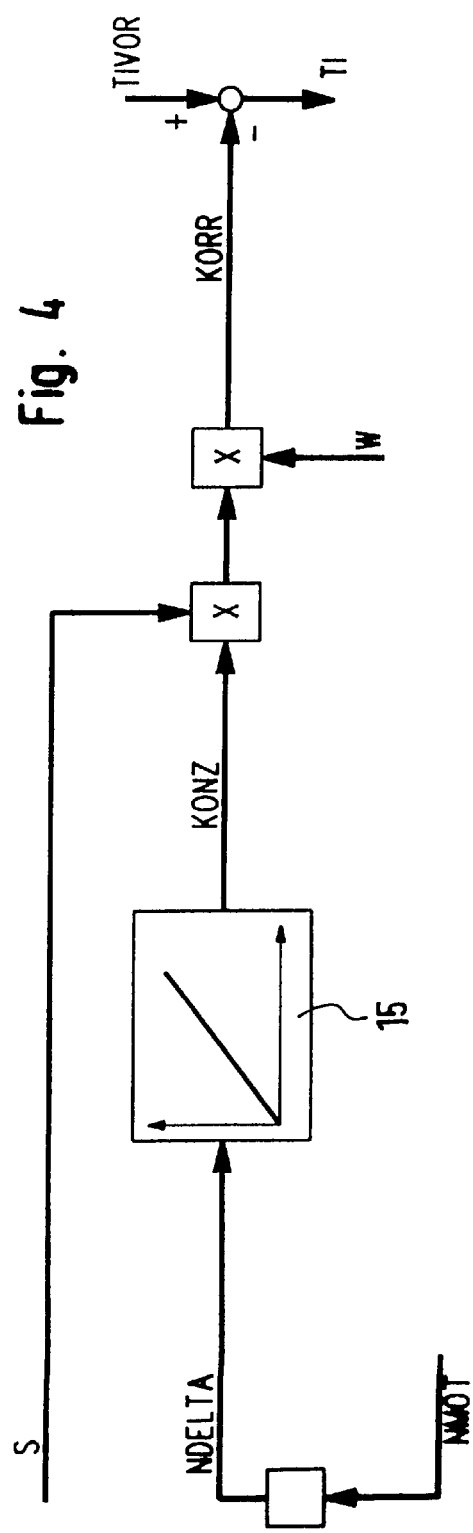

METHOD OF OPERATING AN INTERNAL COMBUSTION ENGINE SUCH AS AN ENGINE OF A MOTOR VEHICLE

FIELD OF THE INVENTION

The invention relates to a method for operating an internal combustion engine such as an engine for a motor vehicle wherein air is drawn into a combustion chamber by suction and regeneration gas is supplied to the air. Fuel is injected directly into the combustion chamber and the fuel and the regeneration gas are combusted in the combustion chamber. Furthermore, the invention relates to an internal combustion engine such as for a motor vehicle with a tank-venting valve with which regeneration gas is supplied to the air drawn by suction into the combustion chamber. The engine includes injection valves with which the fuel is injected directly into the combustion chamber and includes a control apparatus for controlling (open loop and or closed loop) variables which influence the combustion of the fuel and of the regeneration gas in the combustion chamber.

BACKGROUND OF THE INVENTION

Ever higher requirements are imposed on an internal combustion engine of a motor vehicle with respect to a reduced consumption of fuel, on the one hand, with a simultaneously low discharge of toxic exhaust gases, on the other hand. This has led to the situation that the air/fuel mixture (emanating from the fuel in the fuel tank), the so-called regeneration gas is likewise supplied to the combustion process in the engine and is used in this manner. The mass flow and the hydrocarbon concentration of the regeneration gas are determined to consider the regeneration gas when injecting fuel into the combustion chamber. In this way, the fuel quantity, which is contained in the regeneration gas, is computed and thereby can be subtracted from the fuel quantity to be injected. The determination of the hydrocarbon concentration of the regeneration gas takes place for non-direct injection engines with the aid of a lambda probe which is subjected to the exhaust gas generated by the combustion. For this determination, it is necessary to integrate a variable, which is dependent upon the lambda sensor, during regeneration operation over a longer time interval.

Internal combustion engines wherein fuel is not injected directly into the air intake pipe but is injected directly into the combustion chamber have the advantage that a further reduction of the fuel consumption is possible especially for low loads. In these load ranges, the fuel is injected directly ahead of the ignition and preferably into the region of the spark plug. A mixing with air takes place only to a slight extent and it is for this reason that this defines the so-called stratified operation of the direct-injecting engine. In this stratified operation, the ratio of the fuel and air exhibits a characterizing lambda value having a very high value because of the reduced fuel quantity referred to the inducted air. It is known that for high lambda values of the lambda sensor of this kind, only very imprecise measuring results are supplied so that faults are exhibited by an integration of the above-mentioned quantity dependent upon the lambda sensor. For this reason, a computation of the concentration of the regeneration gas with the aid of the integration method known to date serves no real purpose in stratified operation.

SUMMARY OF THE INVENTION

It is an object of the invention to provide a method for operating an internal combustion engine, such as an engine for a motor vehicle, so that a consideration of the regeneration gas is possible even for a direct injection when injecting the fuel.

The method of the invention is for operating an internal combustion engine such as for a motor vehicle. The engine has a combustion chamber and the method includes the steps of: adding regeneration gas for only a short time duration (T) to air inducted into the combustion chamber; injecting fuel directly into the combustion chamber; combusting the fuel and the regeneration gas in the combustion chamber and assuming a specific behavior of the combustion of the fuel and the regeneration gas; detecting the actual combustion behavior of the fuel and the regeneration gas; determining the hydrocarbon concentration of the regeneration gas from the assumed specific behavior and the detected behavior; and, injecting fuel into the combustion chamber during the next time duration (T) for an injection time (TI) dependent upon the hydrocarbon concentration.

The mode of operation of the engine, that is the behavior thereof, is monitored during this short time duration. For example, the engine is monitored with respect to a mode of operation which remains steady state. If this actual mode of operation corresponds to a pregiven desired mode of operation, then the fuel quantity injected into the combustion chamber is correct. If, however, a deviation is determined, then the injected fuel quantity can either be correspondingly reduced or increased on the basis of this deviation during the next short-term supply of regenerated gas. In this way, it is overall possible to correctly compensate the additional fuel supplied via regeneration gas by a corresponding reduction of the injected fuel quantity. An integration (which runs over a longer time) of a quantity dependent upon the lambda sensor is not necessary. The method therefore supplies a fault free adaptation of the injected fuel quantity during the supply of the regeneration gas.

In a further step of the invention, a specific behavior of the combustion of the fuel and of the regeneration gas is assumed to achieve a desired mode of operation of the engine. The actual behavior of the combustion of the fuel and of the regeneration gas is detected and the fuel is supplied during the time duration for an injection time, which is dependent upon the assumed and the detected behavior. Accordingly, an expectation value is pregiven for which it is assumed that the engine maintains a desired mode of operation especially directly after the opening of the tank-venting valve. The expectation value relates to a specific behavior of the combustion in the combustion chamber for which the desired mode of operation of the engine is achieved. Furthermore, the actual behavior of the combustion is detected. As will be described hereinafter, this can be undertaken in various ways. This actual value together with the expectation value defines the basis for determining the quantity of fuel injected into the combustion chambers. Overall, a control (open loop and/or closed loop) is provided for which the actual behavior of the combustion is that quantity with the aid of which the engine is to be adjusted to the desired mode of operation.

In a further advantageous embodiment of the inventions the following takes place: an actual value is generated in dependence upon the detected behavior of the combustion of the fuel and of the regeneration gas; an expectation value is determined in dependence upon the assumed behavior of the combustion; the actual value is compared to the expectation value; and, the injection time is determined in dependence upon the comparison. This defines an expectation value/ actual value comparison with the aid of which the compensation of the additional fuel quantity, which is added by the regeneration gas, is achieved by a corresponding reduction of the fuel quantity to be injected.

For an advantageous configuration of the invention, the regeneration gas is supplied for several sequential time durations to the inducted air. The supply of the regeneration gas is therefore clocked. During each supply, the behavior of the combustion and especially the change of this behavior is monitored. The injection time is changed in dependence thereon. In this way, an approximation method is provided with which, for each supply of regeneration gas, the injection time changes and thereby approaches the correct injection time. With the clocked supply of the regeneration gas, it is achieved that, in the case of an incorrect injected fuel quantity, the correct fuel quantity is quickly injected by the injection valves into the combustion chamber and thereby a correct compensation of the supplied regeneration gas is carried out.

In another advantageous embodiment of the invention, an injection time is determined which provides a drive torque of the engine which remains essentially constant. The injection time is therefore always changed in such a manner that no so-called rocking of the engine occurs. It is therefore attempted to just so configure the behavior of the combustion during the supply of the regeneration gas that a change of the drive torque of the engine is avoided or is at least minimized. If this is achieved that is, the drive torque of the engine does not change daring the supply of the regeneration gas, this means that the supply of the regeneration gas at least has no effect insofar that this supply of the regeneration gas is correctly considered for determining the injected fuel quantity.

In an advantageous further embodiment of the invention, a signal generated by a lambda sensor is used to detect the behavior of the combustion of the fuel and of the regeneration gas. However, it is not the absolute value of the signal of the lambda sensor which is essential but whether the signal of the lambda probe is changed by the supply of the regeneration gas and, if this is the case, in which direction the signal changes. The mentioned measurement inaccuracy of the lambda sensor in stratified operation of the direct injection engine then is of no consequence. Notwithstanding this measurement inaccuracy, it is possible according to the invention to detect the concentration of the regeneration gas with the aid of the lambda sensor.

It is especially purposeful when the actual value is determined from the signal generated by the lambda sensor. This actual value can be further used in the described expectation value/actual value comparison for changing the injection time.

In an advantageous further embodiment of the invention, the determination of the expectation value is undertaken in dependence upon previous measurements. Accordingly, and with a calibrated lambda probe, it is initially measured which value results as the lambda value when switching in the regeneration gas and with the correct reduced injection time. This correct lambda value is used as an expectation value. In this way, it is achieved that already with the expectation value essentially the desired mode of operation of the engine is achieved. Only based on, for example, manufacturing tolerances of the engine, is it still necessary that a change of the injection time must take place based on the expectation value/actual value comparison.

In another advantageous embodiment of the invention, a signal, which is generated by the rpm sensor, is used to detect the behavior of the combustion of the fuel and of the regeneration gas. In this way, a conclusion as to the behavior of the combustion is drawn from a signal corresponding to the rpm of the engine.

It is especially purposeful when an rpm change is determined from the signal generated by the rpm sensor. This is then the actual value and the expectation value is then 0. This expectation value then means that no rpm change should occur. For rpm changes, a conclusion can be drawn as to a quantity of fuel which is too great from an increase taking place during the supply of the regeneration gas. This fuel quantity can be countered by a reduction of the injected fuel quantity. This provides a simple but effective possibility to approximate the assumed concentration rapidly to the actual concentration of the regeneration gas.

It is especially purposeful when a mass flow of the regeneration gas is determined and considered and/or an efficiency of the combustion of the regeneration gas is determined and considered. In this way, and starting from the hydrocarbon concentration of the regeneration gas and the mass flow thereof, a conclusion is drawn as to the fuel quantity in the regeneration gas and then as to the component of the fuel of the regeneration gas which is actually combusted. With the aid of these quantities, the approximation to the actual concentration of the regeneration gas is achieved with still greater accuracy.

Likewise, it is especially purposeful when the operating mode of the engine is otherwise maintained constant. In this way, a falsification because of changes of the operating mode is avoided and defective determinations resulting therefrom of the actual concentration of the regeneration gas are avoided.

It is especially significant that the realization of the method of the invention is in the form of an electric storage medium which is provided for a control apparatus of an engine especially of a motor vehicle. A program is stored on the electric storage medium which can be run on a computer apparatus such as a microprocessor and is suitable for executing the method of the invention. In this case, the invention is realized by a program stored on the electric storage medium so that this storage medium, which is provided with the program, defines the invention in the same way as the method which is carried out by the program.

For the engine according to the invention, it is especially advantageous when a lambda sensor, which is connected to the control apparatus, and/or a rpm sensor, which is connected to the control apparatus, is provided for detecting the behavior of the combustion of the fuel and of the regeneration gas.

In an advantageous further embodiment of the invention, a sequence is provided which is realized by the control apparatus for driving the injection valves in dependence upon the desired value and the actual value.

BRIEF DESCRIPTION OF THE DRAWINGS

The invention will now be described with reference to the drawings wherein:

FIG. 3 is a schematic block diagram of a first embodiment of the method of the invention; and, FIG. 4 is a schematic block diagram of a second embodiment of the method of the invention.

DESCRIPTION OF THE PREFERRED
EMBODIMENTS OF THE INVENTION

Figure 1:
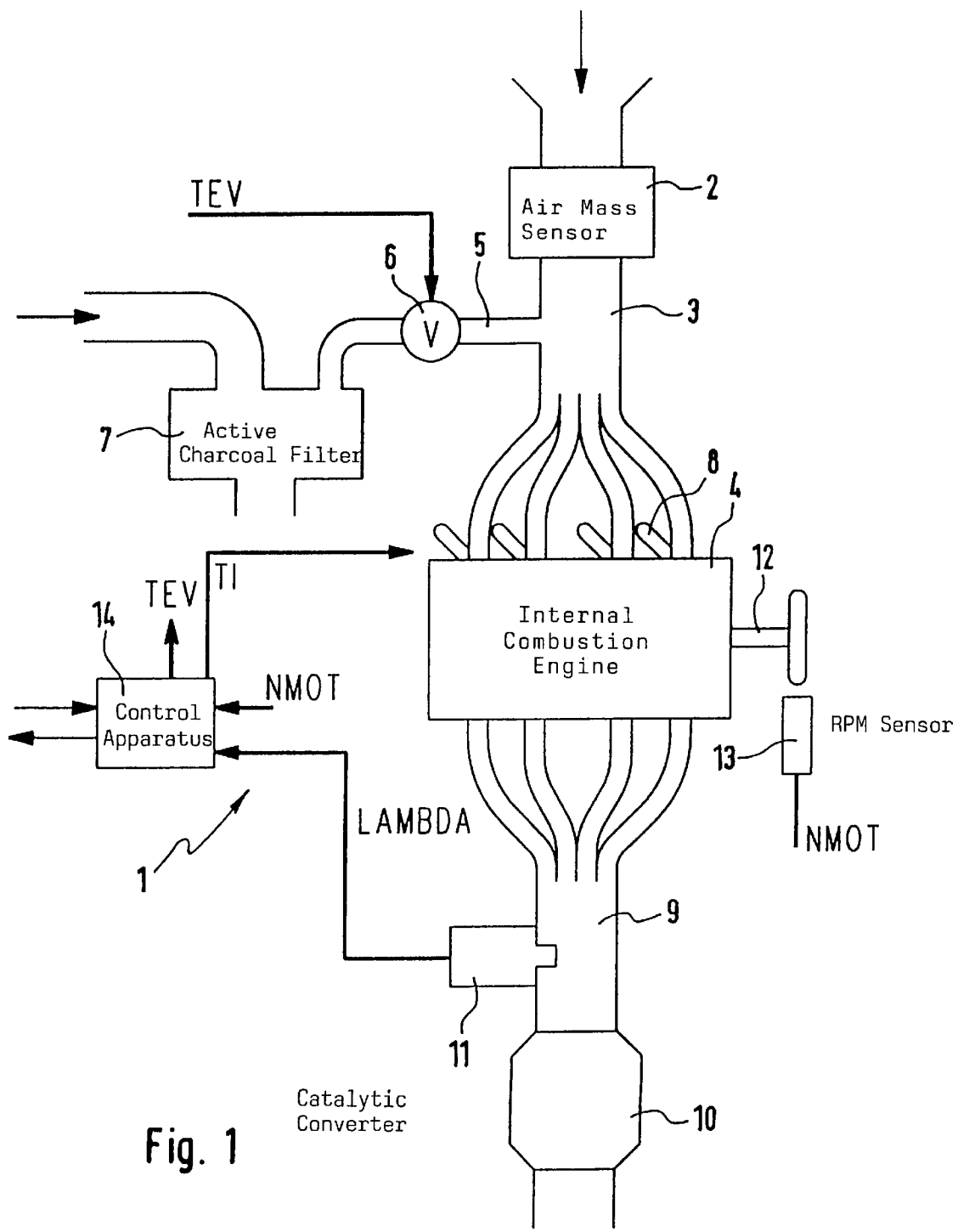
FIG. 1 is a schematic block diagram of an internal combustion engine according to an embodiment of the invention.

In FIG. 1, an internal combustion engine 1 is shown wherein the air is supplied to an engine block 4 over an air mass sensor 2 (such as a hot-film air-mass sensor) and via an air intake manifold 3. The air intake manifold 3 is connected to a tank-venting pipe 5 via which regeneration gas can be added to the inducted air. A tank-venting valve 6 is connected into the tank-venting pipe 5. The regeneration gas can be turned on and off via the tank-venting valve 6. Furthermore, an active charcoal filter 7 is connected into the tank-venting pipe 5 with which the regeneration gas can be intermediately stored.

Combustion chambers are contained within the engine block 4 into which the air with the supplied regeneration gas is dragon by suction. An injection valve 8 is allocated to each of the combustion chambers and fuel can be injected directly into the particular combustion chamber with the injection valve 8. In the combustion chamber, the fuel and the inducted air with the added regeneration gas is ignited with the aid of a spark plug and is combusted.

The exhaust gas arising from the combustion is discharged via an exhaust-gas pipe 9 and a catalytic converter 10. A lambda sensor 11 is mounted in the exhaust-gas pipe 9. The composition of the generated exhaust gas is measured with the aid of the lambda sensor 11.

A crankshaft 12 is set into rotational movement in a running internal combustion engine. An rpm sensor 13 is allocated to the crankshaft 12 and the rpm of the engine 1 is measured with this sensor.

An electrical control apparatus 14, such as a microprocessor, has an electric storage medium such as a read-only memory. This apparatus 14 is provided to control (open loop and/or closed loop) the variables which influence the combustion of the fuel and of the regeneration gas in the combustion chamber. The control apparatus 14 is electrically connected to the tank-venting valve 6, the injection valves 8, the lambda sensor 11 and the rpm sensor 13. The control apparatus 14 receives a signal LAMBDA from the lambda sensor 11 and a signal NMOT from the rpm sensor 13. The signal LAMBDA represents the composition of the discharged exhaust gases and the signal NMOT represents the rpm of the engine 1. The control apparatus 14 emits a signal TEV to the tank-venting valve 6 and a signal TI to the injection valves 8. The signal TEV opens and closes the tank-venting valve 6 and the signal TI opens a particular injection valve 8.

For a closed tank-venting valve 6, only air is drawn by suction into the combustion chamber of the engine 1. In stratified operation, that is for low load, fuel is directly injected into the combustion chamber directly in advance of the ignition and in the direct vicinity of the spark plug triggering the ignition. The injected fuel quantity is determined by the control apparatus 14 in dependence upon the load, a desired low fuel consumption, a desired composition of the discharged exhaust gases and the like and this fuel quantity is adjusted via a corresponding injection time TI by the control apparatus 14 at the injection valves 8.

For an open tank-venting valve 6, the regeneration gas is supplied to the inducted air. This has the consequence that additional fuel reaches the combustion chamber because of the regeneration gas. In order that the desired requirements with respect to fuel consumption and the like can be satisfied by the engine 1, it is necessary that the additional fuel quantity, which is added by the regeneration gas, is considered in the injection of the fuel via the injection valve 8. The quantity of fuel to be injected must be reduced approximately by that amount which is added by the regeneration gas as fuel. Here, especially the efficiency of the combustion of the regeneration gas in the combustion chambers must be considered, that is, the fact that, in stratified operation, the regeneration gas (which is supplied essentially homogeneously to the combustion chamber) is not completely combusted but is only partially combusted.

Since regeneration gas is the fuel vaporized in the fuel tank, the composition of the regeneration gas, and especially the hydrocarbon concentration thereof, is not known. However, this is necessary for the determination and therefore for the consideration of the fuel added by the regeneration gas. Accordingly, the method described below is performed to determine the concentration of the regeneration gas.

Figure 2:
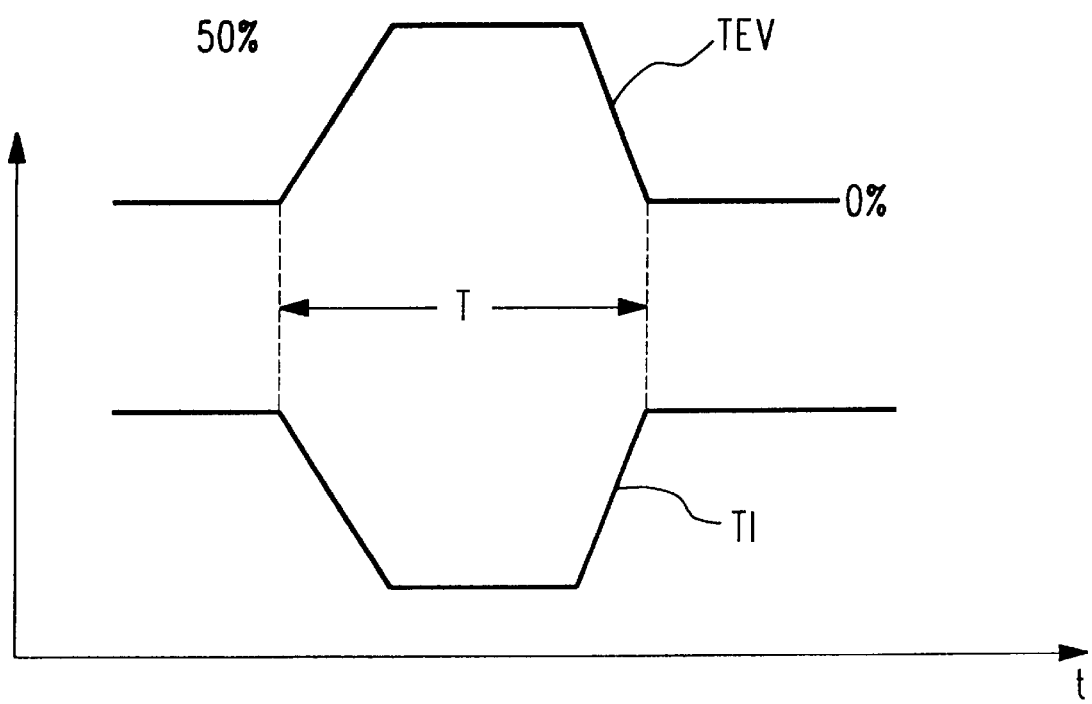
FIG. 2 is a time diagram of two signal traces occurring in the engine of FIG. 1.

In FIG. 2, the signal TEV, which controls the tank-venting valve 6, and the signal TI, which controls the particular injection valve 8, are plotted as a function of time (t). The tank-venting valve 6 is, for example, opened from 0% to 50% (that is half opened) during the time interval T. At the same time, the injection time TI is reduced during this time interval T. The particular signal traces are ramp shaped. As will be explained below, the injection time TI shown is dependent upon the method described below.

The fuel (provided as a consequence of the regeneration gas supplied with the opening of the tank-venting valve 6 is compensated by the reduction of the injection time TI. However, this compensation is not easily possible because of the unknown concentration of the regeneration gas. It is possible that more or less fuel is supplied to the combustion chambers after opening than before opening. This has the consequence that the behavior of the engine 1 changes by the addition of regeneration gas which can, for example, become manifest by a so-called rocking.

In FIG. 3, a block diagram is shown of the method with which such changes of the behavior of the engine 1 are adaptively minimized. The object of the method is that the drive torque of the engine 1 does not change after opening the tank-venting valve 6; that is, the engine 1 does not rock. The method is carried out by the control apparatus 14 with the aid of a sequence present in the form of a program.

An expectation value LERW is determined from previous measurements and computations and the like. This expectation value LERW must be present to ensure that the required constancy of the drive torque is obtained when there is a reduction of the injection time TI corresponding to FIG. 2 and under otherwise normal constant operating conditions of the engine 1 after the tank-venting valve 6 is opened.

When the tank-venting valve 6 is opened, then the method shown in FIG. 3 is activated. The value LAMBDA is measured by the lambda sensor 11. The value LAMBDA is then, as an actual value, subjected to an expectation value/ actual value comparison to the expectation value LERW defining a desired value and the difference is inputted to integrator 15. A value is read out of the integrator 15 in dependence upon additional variables which influence the combustion of the engine 1, such as the applied load or the instantaneous rpm of the engine. This value corresponds to the concentration KONZ of the regeneration gas.

The fuel of the regeneration gas, which actually comes to combustion in the combustion chambers, is determined on the above basis with the aid of the consideration of the mass flow and/or of the efficiency of the combustion of the regeneration gas. The mass flow and the efficiency of the combustion of the regeneration gas can be computed with the aid of characteristic fields and the like. In FIG. 3, the mass flow is considered with a signal S and the efficiency by a signal W.

Thereafter, a signal KORR is available which defines a corrective value with which the pregiven injection time TIVOR must be corrected so that the above-mentioned compensation of the added regeneration gas is obtained in the sense of a constancy of the drive torque of the engine 1. As a result, the injection time TI results which, for example, can have the trace shown in FIG. 2.

This method is carried out during the time interval T while the tank-venting valve 6 is open. The time interval T is approximately 1,000 ms. Then, the tank-venting valve 6 is again closed for a specific time in order to thereafter carry out the described method for a further time interval T.

The injection time TI is changed for each opening of the tank-venting valve 6 and therefore for each execution of the described method. The injection time TI approaches ever closer that value at which the actual value (that is, the actual lambda value LAMBDA) corresponds to the expectation value (that is, the pregiven lambda value LERW). When this coincidence is achieved, this means that just so much fuel is injected via the injection valves 8 into the engine that the drive torque of the engine 1 remains constant notwithstanding the addition of regeneration gas. The opening of the tank-venting valve 6 is therefore compensated in this state completely by the changed injection time TI with respect to the constancy of the operation of the engine.

For the method described in FIG. 3, the expectation value LERW, which is determined from measurements and the like, defines a desired value at which a behavior of the combustion of the fuel and of the regeneration gas in the combustion chambers; is expected which results in an approximately constant operation of the engine 1. The actually measured lambda value LAMBDA defines an actual value which corresponds to the actual behavior of the combustion of the fuel and of the regeneration gas in the combustion chambers.

In FIG. 4, a block diagram of a method is shown which corresponds essentially to the method described with respect to FIG. 3. Accordingly, the same components and same signals are provided with the same reference numerals. In the following, only the differences of the method of FIG. 4 with respect to the method of FIG. 3 are explained.

In the method of FIG. 4, the signals LERW and LAMBDA are not present. In lieu thereof, the signal NMOT is used which is generated by the rpm sensor 13 in dependence upon the rpm of the engine 1.

An rpm change NDELTA is determined by the control apparatus 14 from the rpm NMOT. This rpm change NDELTA is used directly as data relating to the drive torque of the engine 1. If the tank-venting valve 6 is opened, then a change of the drive torque is detected by the fact that the rpm change NDELTA is unequal to zero. This defines the actual value of the method of FIG. 4. The expectation value is zero because it is intended that virtually no rpm change is present. The actual value is inputted directly into the integrator 15 and the injection time TI is determined in the manner already described with respect to FIG. 3. This injection time TI counters the change of the rpm NMOT so that the rpm change NDELTA becomes less. After several openings and closings of the tank-venting valve 6, the rpm change NDELTA approaches the value zero. This is synonymous with a constant drive torque of the engine 1.

In the method of FIG. 4, the rpm change NDELTA is determined from the actually measured rpm NMOT and defines an actual value which corresponds to the actual behavior of the combustion of the fuel and of the regeneration gas in the combustion chambers. The desired value is in this case zero. For this desired value, a behavior of the combustion of the fuel and of the regeneration gas in the combustion chambers is expected which will have as a consequence an almost constant mode of operation of the engine 1.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine such as for a motor vehicle, the engine having a combustion chamber and the method comprising the steps of:

adding regeneration gas for only a short time duration (T) to air inducted into said combustion chamber;

injecting fuel directly into said combustion chamber;

combusting said fuel and said regeneration gas in said combustion chamber and assuming a specific behavior of the combustion of said fuel and said regeneration gas;

detecting the actual combustion behavior of said fuel and said regeneration gas;

determining the hydrocarbon concentration of said regeneration gas from the assumed specific behavior and the detected behavior;

injecting fuel into said combustion chamber during the next time duration (T) for an injection time (TI) dependent upon said hydrocarbon concentration;

generating an actual value in dependence upon the detected behavior of the combustion of said fuel and said regeneration gas;

determining an expectation value in dependence upon the assumed behavior of said combustion;

comparing the actual value to the expectation value; and, determining the injection time (TI) in dependence upon the comparison.

2. The method of claim 1, comprising the further step of adding said regeneration gas to said inducted air for several sequential time durations (T).

3. The method of claim 1, comprising the further step of determining said injection time (TI) so as to provide a drive torque of said engine which remains constant.

4. The method of claim 1, comprising the further steps of:

providing a lambda sensor for generating a signal (LAMBDA); and, utilizing said signal (LAMBDA) to detect the behavior of said combustion of said fuel and said regeneration gas.

5. The method of claim 4, wherein said actual value is determined from said signal (LAMBDA).

6. The method of claim 5, wherein said expectation value is determined in dependence upon measurements of operating variables of said engine.

7. The method of claim 1, comprising the further steps of:

providing a rpm sensor for generating a signal (NMOT); and, utilizing said signal (NMOT) to detect the behavior of said combustion of said fuel and said regeneration gas.

8. The method of claim 7, comprising the further step of determining a rpm change (NDELTA) from said signal (NMOT).

9. The method of claim 1, wherein at least one of the following is determined and evaluated: a mass flow of said regeneration gas and an efficiency of said combustion.

10. The method of claim 1, wherein the operating state of said engine is held constant.

11. An internal combustion engine such as for a motor vehicle, the internal combustion engine having an air intake manifold through which air is inducted into the combustion chamber of the engine, the engine comprising:

- a tank-venting valve for adding regeneration gas to air inducted into said combustion chamber;
- a fuel-injection valve for injecting fuel directly into the combustion chamber;
- a control apparatus for controlling the variables influencing the combustion of said fuel and said regeneration gas in the combustion chamber;
- said control apparatus including means for actuating said tank-venting valve to move into an open position for a short time duration (T);
- means for detecting the actual combustion behavior of said fuel and said regeneration gas;
- means for generating an actual value in dependence upon the detected behavior of the combustion of said fuel and said regeneration gas;
- means for determining an expectation value in dependence upon the assumed behavior of said combustion;
- means for comparing the actual value to the expectation value; and,
- means for determining the injection time (TI) in dependence upon the comparison.

12. The internal combustion engine of claim 11, further comprising a lambda sensor connected to said control apparatus to detect the behavior of the combustion of said fuel and said regeneration gas.

13. The internal combustion engine of claim 11, further comprising:

- an rpm sensor for detecting the rpm of said engine; and,
- said rpm sensor being connected to said control apparatus; and coacting therewith to detect the behavior of the combustion of said fuel and said regeneration gas.

14. The internal combustion engine of claim 11, said control apparatus functioning to provide a sequence to drive the injection valve in dependence upon a desired value and an actual value.

15. An arrangement for operating an internal combustion engine such as for a motor vehicle, the engine having a combustion chamber and the arrangement comprising:

- means for adding regeneration gas for only a short time duration (T) to air inducted into said combustion chamber;
- means for injecting fuel directly into said combustion chamber;
- means for combusting said fuel and said regeneration gas in said combustion chamber and for assuming a specific behavior of the combustion of said fuel and said regeneration gas;
- means for detecting the actual combustion behavior of said fuel and said regeneration gas;
- means for determining the hydrocarbon concentration of said regeneration gas from the assumed specific behavior and the detected behavior;
- means for injecting fuel into said combustion chamber during the next time duration (T) for an injection time (TI) dependent upon said hydrocarbon concentration;
- means for generating an actual value in dependence upon the detected behavior of the combustion of said fuel and said regeneration gas;
- means for determining an expectation value in dependence upon the assumed behavior of said combustion;
- means for comparing the actual value to the expectation value; and,
- means for determining the injection time (TI) in dependence upon the comparison.

* * * * *

UNITED STATES PATENT AND TRADEMARK OFFICE
CERTIFICATE OF CORRECTION

PATENT NO. : 6,098,606
DATED : August 8, 2000
INVENTOR(S) : Gholamabas Esteghlal and Georg Mallebrein It is certified that error appears in the above-identified patent and that said Letters Patent is hereby corrected as shown below:

Column 2,
Line 56, delete "inventions" and substitute -- invention -- therefor.

Column 3,
Line 24, delete "achieved that" and substitute -- achieved, that -- therefor.
Line 25, delete "daring" and substutitute -- during -- therefor.

Column 5,
Line 12, delete "dragon" and substitute -- drawn -- therefor.
Line 14, delete "chamber" and substitute -- chamber, -- therefor.

Column 6,
Line 23, delete "gas" and substutite -- gas) -- therefor.

Column 7,
Line 30, delete "chambers;" and substitute -- chambers -- therefor.

Column 9,
Line 37, delete "apparatus;" and substitute -- apparatus -- therefor.

Signed and Sealed this

Twelfth Day of March, 2002

Attest:

JAMES E. ROGAN
Attesting Officer     Director of the United States Patent and Trademark Office